(12) United States Patent
Freyer (10) Patent No.: US 11,999,450 B2
(45) Date of Patent: Jun. 4, 2024

(54) ROBOT, SYSTEM AND A METHOD FOR UNDERWATER MONITORING AND MAINTENANCE OF A SHIP'S HULL

(71) Applicant: Shipshave AS, Stavanger (NO)

(72) Inventor: Rune Freyer, Hafrsfjord (NO)

(73) Assignee: Shipshave AS, Stavanger (NO)

( * ) Notice: Subject to any disclaimer, the term of this patent is extended or adjusted under 35 U.S.C. 154(b) by 335 days.

(21) Appl. No.: 17/605,491

(22) PCT Filed: Apr. 17, 2020

(86) PCT No.: PCT/EP2020/060865
§ 371 (c)(1),
(2) Date: Oct. 21, 2021

(87) PCT Pub. No.: WO2020/229091
PCT Pub. Date: Nov. 19, 2020

(65) Prior Publication Data
US 2022/0212764 A1    Jul. 7, 2022

(30) Foreign Application Priority Data
May 10, 2019  (NO) .............................. NO20190599

(51) Int. Cl.
*B63B 59/08* (2006.01)
*B63B 1/26* (2006.01)
(Continued)

(52) U.S. Cl.
CPC ............... *B63B 59/08* (2013.01); *B63B 1/26* (2013.01); *B63B 21/66* (2013.01); *B63H 25/38* (2013.01); *B63B 2059/087* (2013.01)

(58) Field of Classification Search
CPC ... B63B 59/06; B63B 59/08; B63B 2059/082; B63B 2059/087; B63B 59/10;
(Continued)

(56) References Cited

U.S. PATENT DOCUMENTS

| 209,343 A | 10/1878 | Jones |
| 702,965 A | 6/1902 | Kaucher |
(Continued)

FOREIGN PATENT DOCUMENTS

| DK | 201670635 A1 | 3/2018 |
| EP | 1390257 A1 | 2/2004 |
(Continued)

OTHER PUBLICATIONS

Barré, Vincent: International Search Report; PCT/EP2020/060865; dated Jun. 23, 2020, 5 pages.

*Primary Examiner* — Ajay Vasudeva
(74) *Attorney, Agent, or Firm* — Bradley Arant Boult Cummings LLP (57) ABSTRACT

A robot (2) and method for underwater monitoring and maintenance of a ship's hull (1) when the ship is underway, are described. The robot (2) comprises a main body (5), a connector (21) for connecting the robot (2) to a cable (3) for towing the robot (2), a resting base (13) adopted to rest against the ship's hull (1), one or more hydrofoil(s) (6, 7) arranged perpendicular to the length axis of the main body (5), and a rudder (8) arranged at the front part of the main body (5), the main body (5) being a straight and elongated body having a length to width ratio of 5 or more, where the length of the hydrofoil(s) (6, 7) as seen perpendicular to the main body (5), is/are longer than the width of the main body (5), and where the connector (21) for the cable (3) is arranged at one end of a hydrofoil (6), or at an arm extending parallel with the one or more hydrofoil(s).

9 Claims, 4 Drawing Sheets

(51) Int. Cl.
*B63B 21/66* (2006.01)
*B63H 25/38* (2006.01)

(58) Field of Classification Search
CPC .... B63B 1/24; B63B 1/26; B63B 1/28; B63B 2001/281; B63B 1/283; B63B 1/285; B63B 1/286; B63B 1/30; B63B 21/66; B63B 21/663; B63B 2021/666
See application file for complete search history.

(56) References Cited

U.S. PATENT DOCUMENTS

| | | | |
|---|---|---|---|
| 826,012 A | 7/1906 | Beelendorf | |
| 3,760,761 A * | 9/1973 | Umazume | B63B 21/66 114/244 |
| 4,463,701 A * | 8/1984 | Pickett | B63B 21/66 114/331 |
| 4,676,183 A * | 6/1987 | Conboy | A01K 73/025 114/244 |
| 4,729,333 A * | 3/1988 | Kirby | B63B 21/66 114/244 |
| 5,947,051 A | 9/1999 | Geiger | |
| 6,886,486 B2 * | 5/2005 | Van Rompay | B63B 59/08 114/222 |
| 6,901,876 B2 | 6/2005 | Geriene et al. | |
| 7,660,190 B2 * | 2/2010 | Keskes | B63B 21/663 114/244 |
| 10,179,634 B2 * | 1/2019 | Van Rompay | B08B 1/002 |
| 2011/0282536 A1 | 11/2011 | Rooney, III | |

FOREIGN PATENT DOCUMENTS

| | | |
|---|---|---|
| EP | 3025951 A1 | 6/2016 |
| GB | 2038721 A | 7/1980 |
| KR | 20170065916 A | 6/2017 |
| SU | 893713 A1 | 12/1981 |
| WO | WO-0136265 A1 | 5/2001 |
| WO | WO-2005014387 A1 | 2/2005 |
| WO | WO-2015171874 A1 | 11/2015 |

\* cited by examiner

ROBOT, SYSTEM AND A METHOD FOR UNDERWATER MONITORING AND MAINTENANCE OF A SHIP'S HULL

TECHNICAL FIELD

The present invention relates to a robot for underwater monitoring and maintenance of a ship's hull, and to a system and a method for monitoring and maintaining the underwater hull of a ship when it is underway, using the robot. More specifically, the invention relates the mentioned robot and a method and system using the robot that enables removing of biofouling, inspections, reducing roughness, and performing other services to a hull during commercial transit speeds of the ship.

BACKGROUND ART

Maintenance and inspection of ship hull is normally performed in dry dock. Dry dock inspection and maintenance is expensive, time consuming and the vessel is taken out of active duty. Another disadvantage of performing works out of the water is that inspections cannot be performed in the working environment, meaning that flow patterns are poorly understood. Understanding the real flow patterns during voyage can provide information to improve the operation and fuel economy. Work tools containing cleaning and surface treatment tools can remove biofouling on the hull and reduce hull drag, improving fuel economy.

Biofouling is a major challenge for shipping as fouling on a ship's hull increases the drag significantly, reduces the hydrodynamic performance of the vessel and increases the fuel consumption significantly. Biofouling starts as a thin biofilm that adheres to the hull surface creating good conditions for larger plants, mussels and barnacles to adhere to the hull. If not removed the biofouling may form thick layers of organic matter resulting in an ecosystem fastened to the hull. According to IMO the biofouling is a major source for spreading of unwanted species to new locations, a spreading that is environmentally unwanted.

Antifouling paint, some of which are self-polishing by fluid flow, are used to reduce formation and the adhesion of biofouling and delay the formation of biofilm and more severe biofouling. Additionally, biofouling comprises environmentally unwanted chemicals, many of which have been banned the last few years. Even though the painting industry is working hard to develop more efficient antifouling having a lesser impact on the environment, the antifouling can only delay the development of biofouling, not stop the formation thereof.

The most frequent method of cleaning has been with high pressure cleaning in dry dock. High pressure cleaning increases the roughness of the paint. The process is manual and seldom incorporate automated process control to maintain the paint roughness as it is applied onto a ship. The fact is therefore that cleaning can reduce long term hull performance.

Several concepts for cleaning of hulls without needing to put the vessel in a drydock have been suggested. The concepts aim at improving hydrodynamic performance of the hull by removing organic materials.

It is well known to use remotely controllable vehicles (ROV's) for inspecting and scrubbing the outer side of a ship's hull see e.g. KR20170065916A, WO 01171874 A1, US 2011282536 A1, U.S. Pat. No. 5,947,051 A, and DK201670635 A1. The ROV's may be a good solution for cleaning and scrubbing a hull when the vessel is in harbor or at anchor but due to excessive drag it is not suitable when the vessel is moving in the water.

Additionally, several patents describe apparatuses for scrubbing of vessels during passage, apparatuses controlled by means of ropes or vires, some of which having rotating brushes powered by the velocity difference between the vessel and the water. See e.g. U.S. Pat. Nos. 826,012 A, 702,965 A, EP1390257 A1, U.S. Pat. No. 2,093,434A and GB2038721 A. Cleaning with brushes is aimed at rapidly removing the biofouling, not to maintain the paint quality.

GB2038721 A, U.S. Pat. No. 826,012 A and SU893713A, describe hull cleaning apparatuses using controlled rudders to control depth position of the device, and hydrofoils to keep the apparatus against the hull of the ship. The publications describe the use of turbines and advanced features that increases the drag in the seawater. If the vessel shall operate in commercial transit speed, for example 6-8 m/s, the drag forces will be very large and the rudders will not be able to overcome the forces required to meaningfully steer the location of the robot. The turbines, hydrofoils and structural elements therefore become dominant in generating drag forces which again makes it difficult or even impossible to control the apparatus. U.S. Pat. No. 826,012 A teaches 4 different ropes and a crane to achieve directionality of the unit. GB2038721 A proposes a separate rope in the back of the unit to control directionality so that the unit is applied controllably to the hull. SU893713A also solves the problem relating to control by using multiple control lines to control the position of the device.

WO2005014387 A1, relates to an apparatus for cleaning to a hull exterior of a seagoing vessel when the vessel is moving forward. The apparatus is connected to a carriage which is in moving engagement to at least one rail fastened to the vessel's hull, the carriage being moveable along the rail(s) by means of a motor operated drive means. The hull is cleaned by means of rotating brushes which are powered by a motor receiving power from the vessel or are driven by at least one turbine powered by the movement through the water. During deployment of the apparatus into the water, there is no positive orientation of the apparatus that ensures that the apparatus is deployed with the correct side against the hull. If the apparatus is deployed with the wrong side facing the hull, the apparatus and/or the hull can be damaged. Due to the complex structure with rotating brushes, motors, control mechanisms and turbines, the cleaning unit is hydrodynamically inefficient, causing excessive drag. The complex apparatus causes drag and the resulting force vector between the steering force from the actuated rudder and the drag force from apparatus will together with the density determine the deviation angle of the rope from horizontal. The apparatus is therefore required to have an anchoring point with a small deviation angle from horizontal which is compensated by a movable rope anchoring point as a measure to reach most sections on the hull.

The apparatus according to WO2005014387 A1 is relatively complex having a plurality of moving parts, in addition to requiring one or more rails fastened to the hull. All the technological features are voluminous creating excessive drag forces during transit and making the apparatus complex to handle. The drag forces will be large compared to the rudder forces causing the deviation angle of the rope to be low, making a unit impossible to reach the majority of the hull area.

An object of the present invention is to provide a method and apparatus for maintaining and inspecting the outside of a vessel's hull when the ship is under speed, which is simpler and more reliable than the earlier described methods and apparatuses.

Other objects will be obvious to the skilled persons in reading the present description.

SUMMARY OF INVENTION

According to a first aspect, the present invention relates to a robot for underwater monitoring and maintenance of a ship's hull (1) when the ship is underway, where the robot comprises
- a main body having a front part and a rear end connected with a straight middle part,
- a connector for connecting the robot to a cable for towing the robot is arranged to the front part of the main body,
- a resting base adopted to rest against the ship's hull and being arranged along the full length of the main body,
- one or more hydrofoil(s) arranged perpendicular to the length axis of the main body arranged to force the resting base of the robot towards the ship's hull,
- a rudder arranged at the front part of the main body, perpendicular to the length axis of the main body and the hydrofoil(s), wherein the main body is a straight and elongated body having a length to width ratio of 5 or more, where the length of the hydrofoil(s) as seen perpendicular to the main body, is/are longer than the width of the main body, and where the connector for the cable and is arranged at one end of a hydrofoil, or at an arm extending parallel with the one or more hydrofoil (s).

The elongated and straight body is important for the directionally stability of the robot during operation for monitoring and/or maintenance of a ship's hull. The straight and elongated body, in combination with the connector for the cable being arranged sideways offset, i.e. being arranged offset from the length axis of the main body in a direction being substantially parallel with the surface of the ship's hull when the robot is in operation, is important to ascertain that the robot is correctly oriented when it approaches the hull during deployment of the robot.

According to one embodiment, a front hydrofoil is arranged at the front part and a rear hydrofoil is arranged at the rear end of the main body, and the hydrofoils being arranged substantially parallel to each other and parallel to the plane defined by the resting base.

According to one embodiment, a fixed stabilizing fin is arranged at the aft end of the main body substantially perpendicular thereto and to the hydrofoil(s). A fixed stabilizing fin being arranged at the aft end of the main body further improves the directional stability of the robot, ascertaining that the length axis of the main body of the robot is substantially parallel to the direction of flow of the water along the hull. By keeping the main body directionally stable and substantially parallel with the flow of water, the drag of the robot and sideways forces caused by the water flowing over the robot. Accordingly, it is easier to control sideways movement of the robot by means of the rudder.

According to one embodiment, the fixed stabilizing fin is an integrated part of the main body.

According to one embodiment, the connector for connecting the cable is arranged close to an outer end of the front hydrofoil. Arranging the connector at an outer end of the front hydrofoil A foot for resting against the ship's hull may be arranged at the same end of the front hydrofoil as connector for the cable.

According to one embodiment, the front hydrofoil is asymmetrically arranged about the main body, and where the part of the front hydrofoil to which the cable is fastened is longer than the part at the opposite side of the main body.

The outer surface of the resting surface may comprise one or more fixed brushes, hard rollers, scrapes and/or abrasive materials.

According to one embodiment, the resting base, or elements thereof is/are interchangeable. An interchangeable resting base, and/or interchangeable elements of the resting base, makes it possible to change worn out brushes, rollers, scrapes and/or abrasive materials, or to change to a resting base according to the specific needs.

One or more sensor(s), camera(s), and testing devices with data acquisition may be arranged on the robot.

According to a second aspect, the present invention relates to a method for underwater monitoring and maintenance of a ship's hull when the ship is underway, the method comprising the steps of:
a) deploying a robot as described above, and allowing the robot to set onto the ship's hull,
b) adjusting the length of the cable to adjust the longitudinal position of the robot along the ship's hull,
c) adjusting the rudder to adjust the depth of the robot to allow the robot to travel across the ship's direction of travel once or more,
d) adjusting the length of the cable to adjust the longitudinal position of the robot,
e) repeating steps c) and d) until a predetermined area of the ship's hull is monitored and/or maintained.

DETAILED DESCRIPTION OF THE INVENTION

Figure 1:
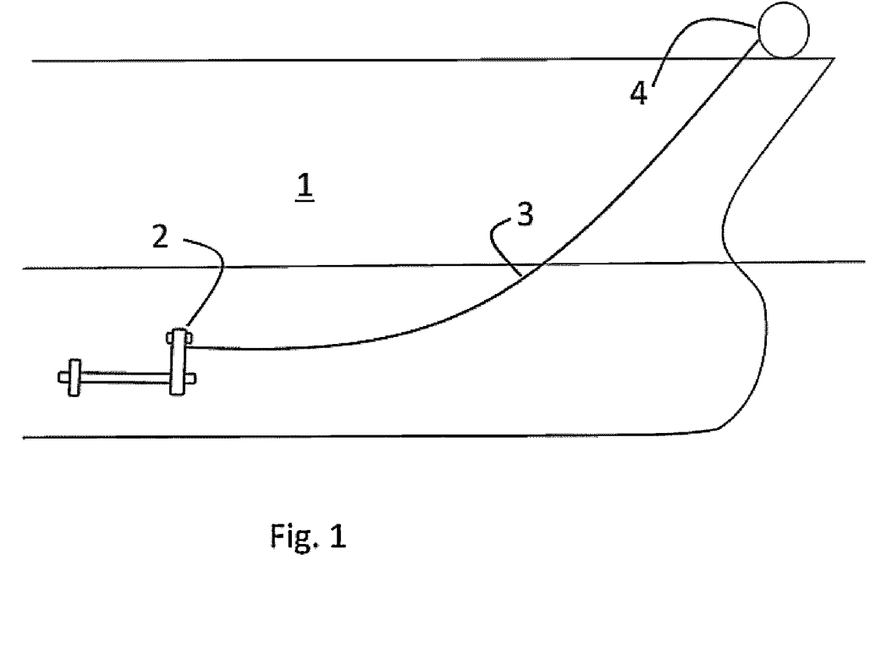
FIG. 1 is an illustration of an embodiment of the present hull maintenance robot in action on a hull.
Figure 2:
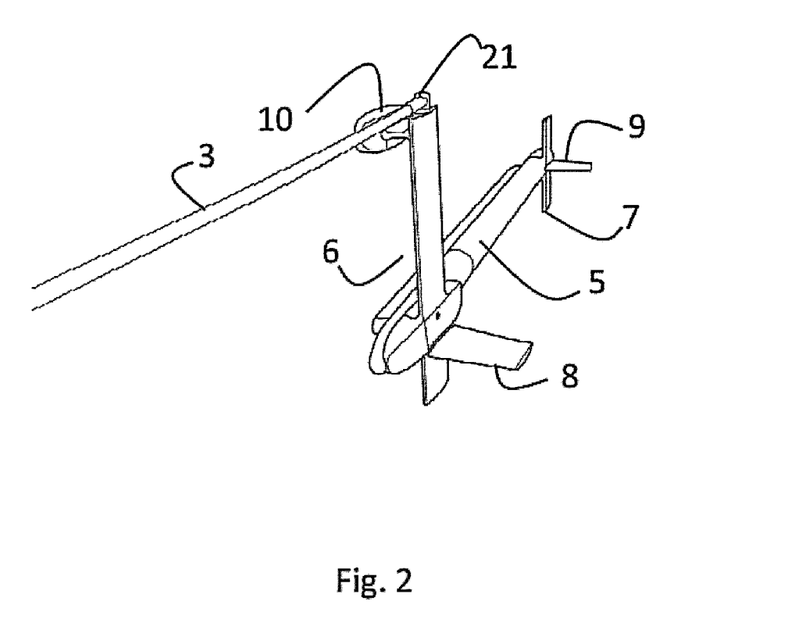
FIG. 2 is a perspective view of an embodiment of the present robot.
Figure 3:
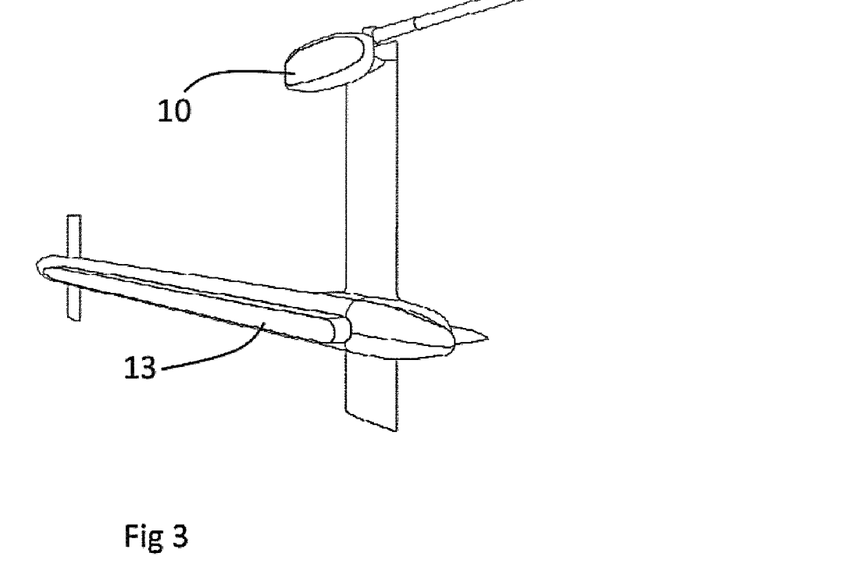
FIG. 3 is a perspective view of the embodiment of FIG. 2 seen from the side intended to be resting at a hull during action.

FIG. 1 is an illustration of a foremost part of a ship's hull 1 and a robot 2 according to the present invention, resting on the hull 1. A cable 3 is fastened to the robot 2 and to a winch 4 arranged onboard the ship. The length of the cable may be controlled by means of the winch 4.

The robot illustrated in figures comprises a longitudinal main body 5 to which a front hydrofoil 6 is arranged across the front part of the main body 5, and a rear hydrofoil 7 arranged at the rear end of the main body 5. The front hydrofoil 6 and the rear hydrofoil 7 are arranged substantially parallel to each other, and substantially perpendicular to the length axis of the main body 5. A rudder 8 is arranged the foremost part of the main body substantially perpendicular to both the main body 5 and the front hydrofoil 6. A fixed stabilizing fin 9 is arranged substantially perpendicular to both the main body 5 and the rear hydrofoil 7. The front hydrofoil in the illustrated embodiment is not arranged symmetrical about main body. A foot 10 is arranged at the end of the longest part of the front hydrofoil 6. A connector 21 for connection of the robot 2 to a cable 3 for towing the robot 2, is in the illustrated embodiment arranged at the outer end of longest part of the front hydrofoil 6.

The main body 5, comprising a front part and a rear end connected by a middle part, is a straight elongated body shaped to cause minimum drag when the robot is in use. A resting base 13, being a substantially flat surface, is arranged along the side of the main body 5 which is intended to rest against the ship's hull when the robot is in use. The resting base 13 runs along most of the length of the main body, and substantially over the total width thereof. The surface of the resting base intended to rest on the ship's hull depends on the operation to be done. If the robot is intended to be used for monitoring purpose only, the resting base is covered with a smooth surface to cause minimum friction between the robot and the ship's hull. For maintenance operations, the resting surface has a surface suitable for the operation, and may comprise brushes, abrasives, scrapes, rollers etc. The resting base may be divided in two or more elements that may be covered by the same or different surface materials that are used for the intended maintenance operations. Scrapes and rollers may be used to crush or remove barnacles and the like, whereas brushes, with normal or abrasive bristle, may be used to remove biofilm and/or crushed barnacles. Abrasives may be used on the resting surface for smoothening the outer surface of the ship's hull. Additionally, the resting surface or elements thereof, are preferably interchangeable to be able to use the robot for different purposes at different times so that the robot becomes a flexible tool.

Typically, the main body is length to width ratio of the main body is 5 or more, i.e. the length of the main body is at least 5 times the width thereof. More preferred the length ratio is about 8 and may even be 10 or higher. The high length to width ratio of the main body, and the arrangement of the stabilizing fin at the rear part and the rudder at the foremost part of the main body, stabilizes the robot and makes it easier to control the vertical movement of the robot when in use.

The embodiment of the robot illustrated in the figures has a front hydrofoil 6 that is not symmetrically arranged to the main body, as the front hydrofoil is longer at one side of the main body than at the other side thereof. In this embodiment, the foot 10 is arranged at the outer end of the longest part of the front hydrofoil, seen from the main body. The cable 3 is connected to a connector 21 arranged at the front hydrofoil close to the foot 10.

The present robot may be deployed by means of a simple crane or the like, to lift the robot from a position on deck of the ship, to a position hanging at one of the sides of the ship. Hanging in the cable 3 before the robot tail is entering the sea, the wind will turn the tail downwind because of the aft part, or tail, of the robot has a larger wind straightening moment compared to the front, or head part. When the robot is put into the sea from a vessel being under speed, and the robot hanging in the cable 3, the rear part of the robot will also touch the sea first and will result in the robot being turned so that robot is oriented with its aft end downstream. The asymmetrical arrangement about the main body's length axis of the connection point for the cable 3 is important for obtaining the required orienting the robot without having to use any special equipment for putting the robot into the sea.

The hydrofoils 6, 7 are wing shaped and are arranged so that they under speed and under water will force the main body 5 and the foot 10 towards the hull, so that the front and rear hydrofoils are arranged substantially parallel with the hull, and the stabilizing fin 9 and the rudder 8 substantially perpendicular to the hull. The surface of the foot 10 resting against the hull is preferably smooth, and is optionally covered by a low friction material, to have minimal friction towards the hull. Alternatively, one or more rollers may be arranged on the foot 10, to reduce the friction even further.

A cleaning device is arranged on the surface of the resting base (13) of the main body resting at the hull 1. The cleaning device may be a brush, an abrasive surface, scrapes, one or more rollers, or the like, or a combination or one or more of the mentioned cleaning devices depending on the nature of the fouling to be removed or reduced. Independent of the type of cleaning device 13, the cleaning action is caused by movement of the robot in lengthwise or crosswise direction, reducing the number of moving parts of the robot to a minimum, compared to prior art solutions using rotating brushes. A brush is used for the cleaning device 13 to remove relatively soft fouling, such as slime, algae, seaweed and kelp. Rollers of a hard material, or scrapes, may be needed to crush barnacles or mussels before removal by means of brushes. The use of an abrasive surface, or a brush having abrasive bristles, may be used to smoothen the hull surface reduce the friction between the ship and the water. Additionally, fouling is reduced after polishing as fouling does not fasten as easy to a smooth surface as to a less smooth surface.

Typically, the present robot is used when the ship is at cruising a speed and out in open sea. The speed of the ship may vary from the type of ship and the ship has a cargo onboard or not. A large tanker filled with oil has a typical speed of 12-15 knots, whereas the speed under ballast may be about half of that. Other ships such as cruise ships and cargo vessels may go at higher speed than a tanker, dependent on the situation.

The present robot is held against the hull by means of the force resulting from the speed of water meeting the wing shaped hydrofoils 6, 7. The force generated by the foils depends on the speed of water over the wing profile, i.e. the speed of the ship, the angle of the foils relative to the flowing water, the profile of the foils and the size of the foils. If the force generated by the foils is too low, the efficiency of cleaning or polishing action is reduced, or the robot may deviate from adherence to the hull and out in the surrounding water. If the force is too high, the friction between the robot and the hull may be too high, and the required movement of the robot over the outer surface of the will be highly reduced or even stopped.

The force with which the robot is forced towards the hull at given speed of the vessel may be set once for all for a given ship based on the knowledge of the normal speed of the vessel. Alternatively, and if needed, the foils, the angle of attach of the foils relatively to the meeting flow of water or the profile of the foils, may be adjusted either before putting the robot into the sea, or by any remotely adjustable way, to make the robot more flexible for use under different circumstances.

Figure 6:
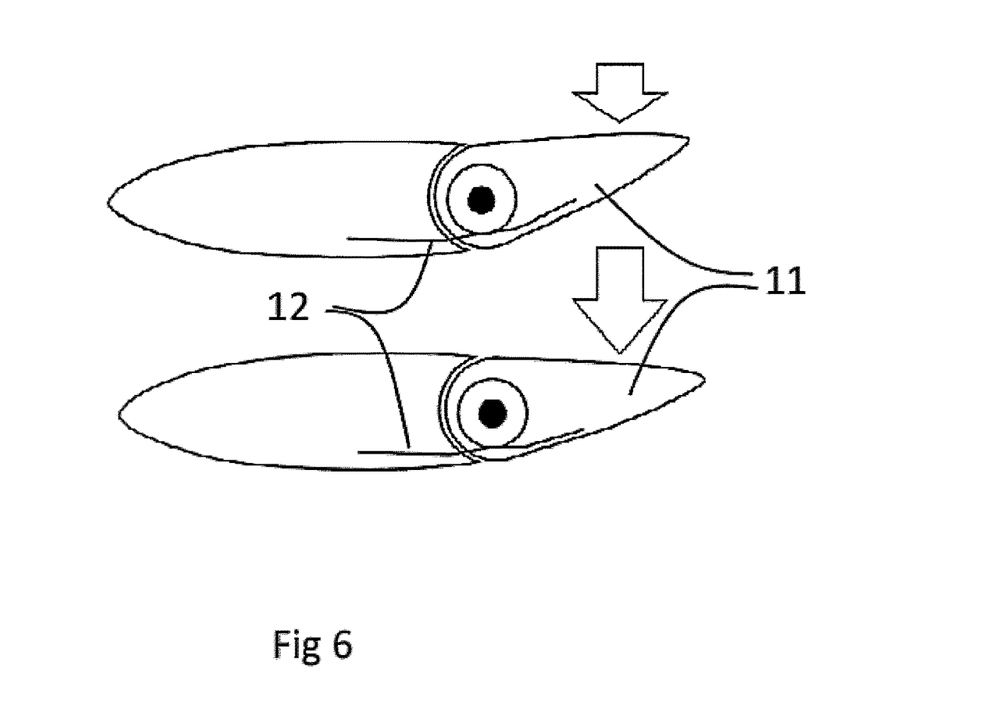
FIG. 6 is an illustration of a hydrofoil having spring loaded flaps.

FIG. 6 illustrates a hydrofoil 6, 7 having spring loaded flaps 20 for automatic adjustment of the flaps for adjusting the force towards the hull created by the foils. The skilled person will understand that the illustrated spring may be substituted with a locking device that may be adjusted before deploying the robot, or by a remotely controllable actuator. Alternatively, the foils may be adjusted by adjusting the angle of the foils relatively to the flowing water, preferably by allowing the foils to rotate about an close to the front of the foils, the axis being parallel to the length axis of the foils and adjusting the angle of the foils to the flowing water by means or screws or the like, or by using hydrofoils made of rubber or other flexible material.

For cleaning of the outer hull, the robot is put into the sea, as described above, and automatically orients itself so that the length axis of the robot is oriented to be substantially parallel to the length axis and to the outer surface of the ship. This orientation is obtained by means of the rudder 8 being close to the front end of the main body, and the stabilizing fin 9 being close to the distal end of the main body, and to the distance between the rudder and the stabilizing fin. The robot is then controlled to move sideways relative to the length axis of the robot by controlling the rudder 8. By rotating the rudder in a first direction, the robot is forced in a first direction across the direction of the flowing water caused by the vessel, and vice versa. By rotating the rudder to one direction, allowing the robot to travel over a certain sideways distance before rotating the rudder is turned the other way, the cleaning surface 6 is caused to travel over an area of the ship's hull and at the same time clean or polish the hull, dependent on the nature of the cleaning surface 6. In this way, the robot is able travel sideways from the waterline to the bottom of the ship, to clean the bottom from the side of the vessel where the robot is connected to the vessel.

Bilge keels may constitute a hindrance for the robot, making it difficult to reach the parts of the hull being deeper than a bilge keel. However, the fouling is heaviest close to the waterline due to the availability to sunlight, and that the problem with fouling is reduced with depth. Accordingly, cleaning of the hull from the waterline to a bilge keel is often sufficient between the intervals for docking of the vessel.

After cleaning one sector of the vessel, the length of the cable is adjusted before the robot again is controlled as described in the above paragraph. Preferably, the length of the cable is adjusted so that the area washed by using a first length of the cable, overlaps slightly the area covered after the next adjustment of the cable. In this way the ship's hull may be washed sector by sector.

Figure 4:
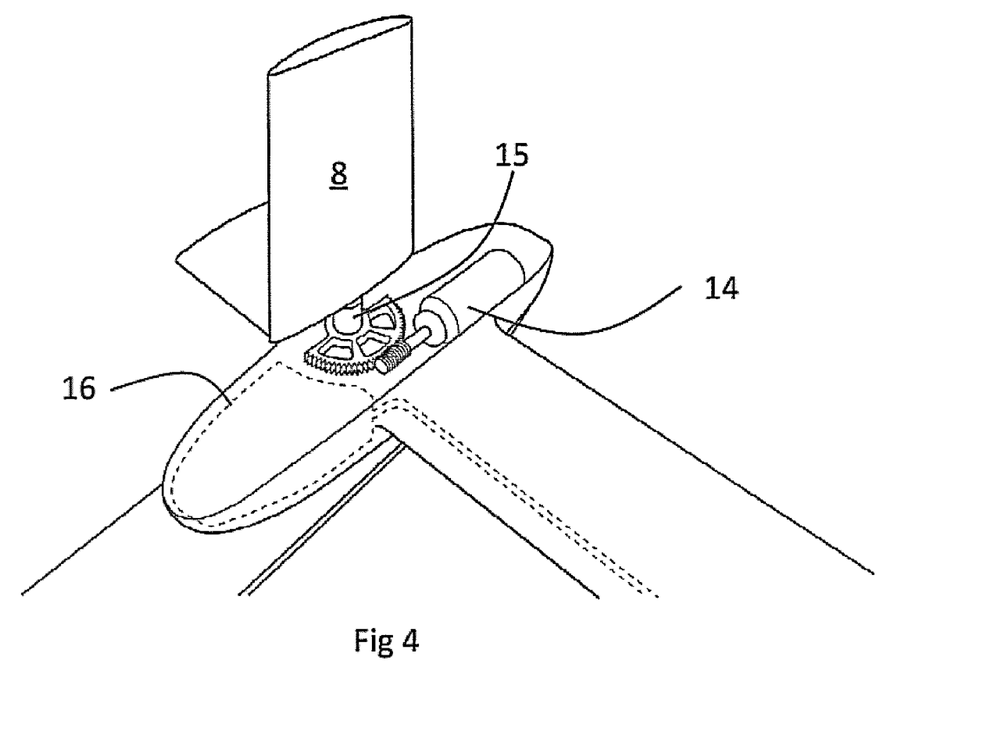
FIG. 4 is a detailed view of the embodiment in FIG. 2.

FIG. 4 illustrates one embodiment of a rudder and control mechanism for the rudder. The skilled person will understand that the rudder may be controlled by means of wired non-wired communication means. The rudder 8 is arranged substantially perpendicular to the length axis of the robot, pointing out from the hull of the ship when the robot is in use. The rudder is arranged on a rudder axle 15 that can be controlled by means of an actuator 14. The rudder axle maybe controlled directly by the actuator, or via a gear as illustrated.

The rudder is preferably a balanced rudder, i.e. a rudder where a part of the rudder is arranged upstream of the rudder axle 15, and a part is arranged downstream, so that the forces acting against rotating the rudder substantially cancel each other's. The use of a balanced rudder reduces the force needed to control rotate the rudder and thus the power consumption for control of the robot. By using a balanced rudder, the power consumption for the robot may be kept sufficiently low to use a battery arranged inside the robot as the source of power, to avoid the need of power supply via the cable.

Figure 5:
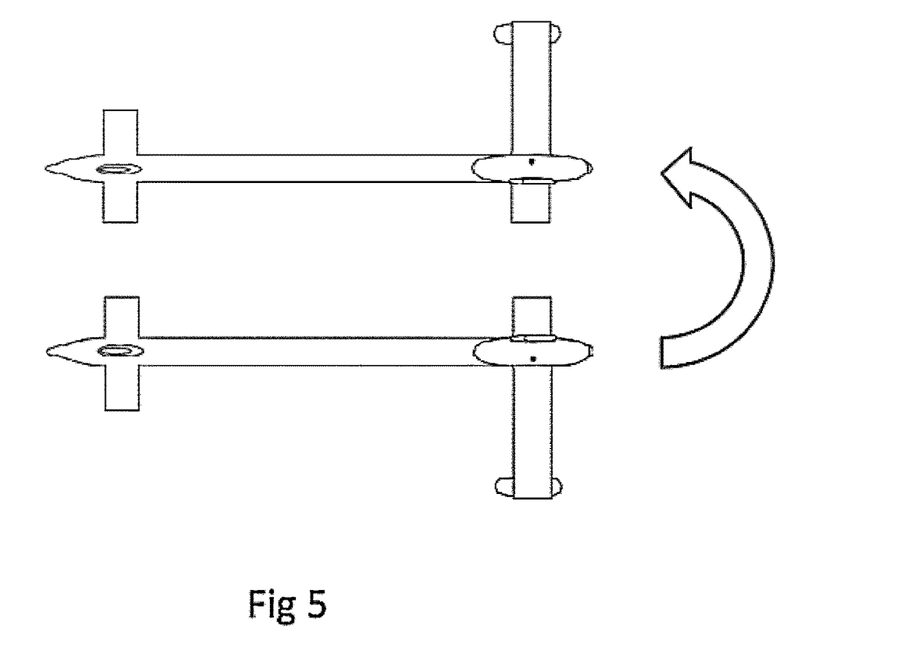
FIG. 5 is an illustration of conversion of an embodiment of the present robot from port side to starboard use.

Due to the fact that the preferred robot is asymmetrical about the main body as seen in a bird eye's view, the robot is configured for use at the starboard or the port side of the ship. FIG. 5 illustrates how the front hydrofoil and rudder part may be loosened and rotated to convert from a port to a starboard version, and vice versa.

The present robot is put into sea as described above, and the length of the cable 3 adjusted so that the robot has the correct lengthwise position. The robot may then be moved sidewise by adjusting the rudder 8 so that the robot turns to port or starboard. This sidewise movement causes the cleaning surface to slide against the hull. The skilled person will understand that the present robot is no suitable for cleaning of propellers, thrusters, and active wave dampeners, and that it may be a challenge to clean a bulb. However, as most of the hull may be cleaned by means of the present robot, these parts of the ship maybe cleaned by other means when the ship is in harbor or at anchor.

FIG. 7 *a-*7*e* illustrate different configurations for controlling and adjusting the robot. FIG. 7*a* corresponds to the embodiment described above, where the cable for the robot is connected to a winch, alternatively the winch may be in a different position and the cable is directed via a pulley at the point identified with reference numeral 4, arranged at the foremost part of the ship's deck.

Figure 7A:
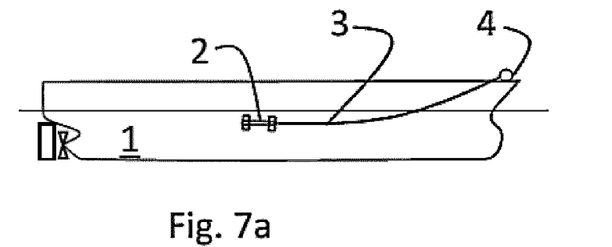
FIGS. 7a-7e illustrate different configurations for controlling and adjusting the robot.
Figure 7B:
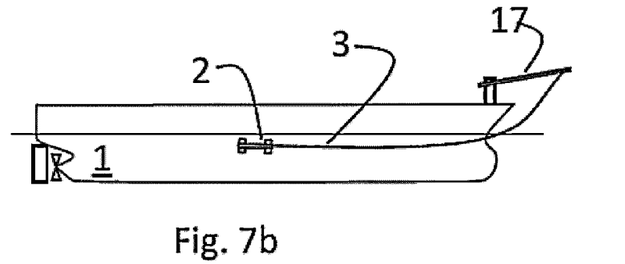

Alternatively, and as illustrated in FIG. 7*b*, the cable may be connected to the ship via a boom of crane 17 arranged near the ship's bow. The use of a crane allows for better control when putting the robot into the sea and when taking it up again, by holding the robot clear of the hull during lifting and lowering the robot. Additionally, the crane makes it possible to reach areas of the foremost part of the hull that is impossible or difficult to reach in the configuration illustrated in FIG. 7*a*.

Figure 7C:
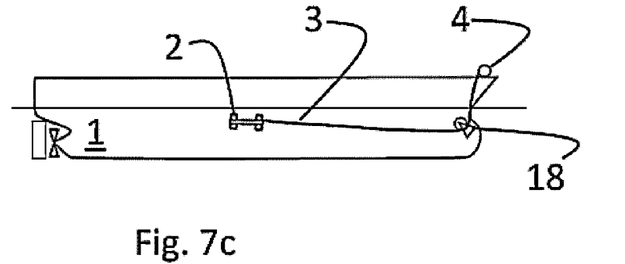

FIG. 7*c* illustrates an alternative configuration to the configurations of FIGS. 7*a* and 7*b*, where the cable runs from the winch 4 and over a pulley 18 arranged at the foremost part of the hull, to allow improved access to the foremost part of the hull.

Figure 7D:
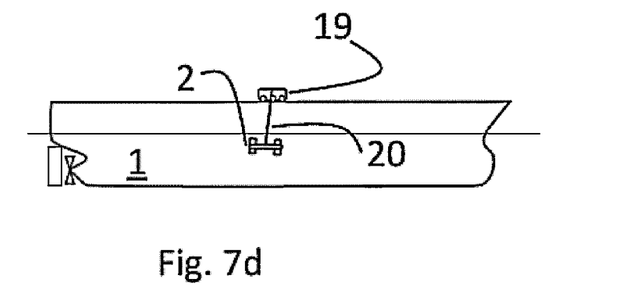
Figure 7E:
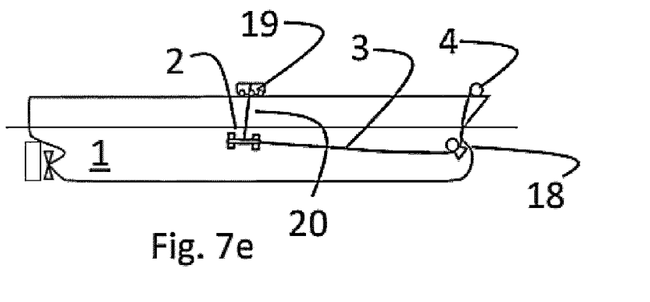

FIGS. 7*d* and 7*e* illustrate the use of a trolley 19 arranged on a not shown track along the deck of the ship. FIG. 7*d* illustrates an arrangement where the robot is controlled by both the cable 3, in an arrangement corresponding to FIG. 7*c*, in addition to being controlled in the vertically direction by a control cable 20 connected to the robot and to the trolley 19. This configuration allows for better control of the robot both in vertical and longitudinal direction. FIG. 7*e* corresponds to FIG. 7*d*, but the cable 3 is removed so that the robot is controlled by the trolley and control wire, only.

The skilled person will understand that the lengthwise position of the robot may be calculated by means of the length of the cable 3. The crosswise movements during cleaning is not as easy to predict or confirm. To get more precise information of the crosswise movements of the robot, and to confirm that the surfaces intended to be cleaned are actually cleaned, it is preferred to use sensors provided on the robot and/or the ship. Information on the sideways movements and position of the robot may be confirmed/calculated by means of pressure sensors arranged on the robot to measure how deep the robot is at any time, by means of distance sensors measuring the distance to known elements on the vessel, such as a bilge keel, or water surface, and/or by using an accelerometer. By combining information from such available sources the position and movement of the robot, may be calculated to confirm where the robot is and that it has been covering the intended area.

Sensors, cameras, and testing devices may also be connected to the robot i.a. to monitor the hull, status of biofouling, area covered by the robot during a maintenance session, success of the treatment performed to the hull, damages on the hull, flow measurements, and performing non-destructive testing methods of different kinds, etc. Data from the sensors, testing devices and/or cameras are either stored in a data acquisition module in the robot to be collected therefrom when the robot is onboard the vessel, or sent via wireless communication or wired data connection to the vessel.

Two different robots designed according to the teaching of this patent was deployed in the water up to 2 meters besides a 22 meter long tug and an 11 meter long shrimp trawler, respectively, at 3-5-7 and 9 knots. The robots had lengths of 1.2 meters to 1.5 meters and mass of 4 to 7 kilograms. In all tests, the robots immediately, when touching the water, aligned itself parallel with the ship with the anterior end towards the bow of the ship and the tail towards the stern of the boat and the rudder was pointing away from the hull. In all the tests at 7 knots or more, the hydrofoils within few seconds steered the robot towards the hull so that the resting base of the robots rested onto the side of the hull. In all tests at 7 knots or more, the main body of the robot was well within 5 degrees from horizontal direction of flow of the water flowing along the hull. In all the tests, the angle of the cable was between 45 and 30 degrees from vertical, showing that the forces developed by the rudder were larger than the forces from the drag of the apparatus.

The invention claimed is:

1. A robot for underwater monitoring and maintenance of a ship's hull when the ship is underway, the robot comprising:
   a main body having a front part and a rear end connected with a middle part;
   a connector for connecting the robot to a cable for towing the robot is arranged to the front part of the main body;
   a resting base adapted to rest against the ship's hull and being arranged along the full length of the main body;
   at least one hydrofoil arranged perpendicular to the length axis of the main body arranged to force the resting base of the robot towards the ship's hull;
   a rudder arranged at the front part of the main body, perpendicular to the length axis of the main body and the at least one hydrofoil; and
   wherein the main body is a straight and elongated body having a length to width ratio of 5 or more, where the length of the at least one hydrofoil as seen perpendicular to the main body, is longer than the width of the main body, and where the connector for the cable is arranged at one end of the at least one hydrofoil, or at an arm extending parallel with the at least one hydrofoil.

2. The robot according to claim 1, wherein the at least one hydrofoil comprises a front hydrofoil and a rear hydrofoil, wherein the front hydrofoil is arranged at the front part and the rear hydrofoil is arranged at the rear end of the main body, and the hydrofoils being arranged parallel to each other and parallel to the plane defined by the resting base.

3. The robot according to claim 1, wherein a fixed stabilizing fin is arranged at the aft end of the main body, perpendicular thereto and to the at least one hydrofoil.

4. The robot according to claim 3, wherein the fixed stabilizing fin is an integrated part of the main body.

5. The robot according to claim 1, wherein the connector for connecting the cable is arranged close to an outer end of the front hydrofoil.

6. The robot according to claim 5, wherein a foot for resting against the ship's hull is arranged at the same end of the front hydrofoil as the connector for the cable.

7. The robot according to claim 6, wherein the front hydrofoil is asymmetrically arranged about the main body, and where the part of the front hydrofoil to which the cable is fastened is longer than the part at the opposite side of the main body.

8. The robot according to claim 1, wherein the resting base, or elements thereof, are interchangeable.

9. A method for underwater monitoring and maintenance of a ship's hull when the ship is underway, the method comprising:
   a. deploying a robot according to claim 1, and allowing the robot to set onto the ship's hull;
   b. adjusting the length of the cable to adjust the longitudinal position of the robot along the ship's hull;
   c. adjusting the rudder to adjust the depth of the robot to allow the robot to travel across the ship's direction of travel once or more;
   d. adjusting the length of the cable to adjust the longitudinal position of the robot; and
   e. repeating steps c) and d) until a predetermined area of the ship's hull is at least one of monitored and maintained.

* * * * *